US010612350B2

(12) United States Patent
Steele et al.

(10) Patent No.: US 10,612,350 B2
(45) Date of Patent: Apr. 7, 2020

(54) CROSSOVER VALVE SYSTEM AND METHOD FOR GAS PRODUCTION (71) Applicant: RAISE PRODUCTION INC., Calgary (CA)

(72) Inventors: Geoff Steele, Calgary (CA); Eric Laing, Calgary (CA)

(*) Notice: Subject to any disclaimer, the term of this patent is extended or adjusted under 35 U.S.C. 154(b) by 534 days.

(21) Appl. No.: 15/022,829

(22) PCT Filed: Oct. 14, 2014

(86) PCT No.: PCT/CA2014/050990
§ 371 (c)(1),
(2) Date: Mar. 17, 2016

(87) PCT Pub. No.: WO2016/051469
PCT Pub. Date: Apr. 16, 2015

(65) Prior Publication Data
US 2016/0230520 A1    Aug. 11, 2016

Related U.S. Application Data (60) Provisional application No. 61/889,768, filed on Oct. 11, 2013.

(51) Int. Cl.
*E21B 43/12* (2006.01)
*E21B 34/10* (2006.01)
(Continued)

(52) U.S. Cl.
CPC ............ *E21B 43/123* (2013.01); *E21B 33/12* (2013.01); *E21B 34/10* (2013.01); *E21B 34/102* (2013.01); *E21B 43/121* (2013.01); *F16K 31/426* (2013.01)

(58) Field of Classification Search
CPC .............................. E21B 34/10; E21B 43/123
See application file for complete search history.

(56) References Cited

U.S. PATENT DOCUMENTS 3,086,593 A      4/1963   Chitwood
3,277,838 A  *  10/1966   Canalizo ............... E21B 43/123
                                                         137/155

(Continued)

FOREIGN PATENT DOCUMENTS

GB           2429722           3/2007

*Primary Examiner* — Robert E Fuller
*Assistant Examiner* — Lamia Quaim
(74) *Attorney, Agent, or Firm* — Bennett Jones LLP (57) ABSTRACT

A crossover valve assembly for insertion into production tubing, or integral with production tubing, includes an outer housing, an inner production tube, a pilot section responsive to external pressure to open an activation passage above a pre-determined pressure, a power section responsive to pressure in the activation passage to open an injection opening; and a crossover valve responsive to pressure in the injection opening to open a crossover port, allowing fluid communication from outside the outer housing to within the inner production tube. The crossover valve assembly may be used in a method of producing a vertical, deviated or horizontal gas well having an annular space defined by a well casing and a concentrically disposed production tubing, wherein an annulus exists above a packer isolating the annulus, includes the steps of (a) opening a communication path through the tubing into the annulus, and if necessary, removing any fluid in the annulus, (b) landing a crossover valve assembly within the production tubing above the packer and exposed to the annulus; and (c) injecting gas into the annular space to open the crossover valve and enter the production tubing, wherein the injected gas lifts liquids in the production tubing to the surface.

10 Claims, 7 Drawing Sheets

(51) Int. Cl.
*F16K 31/42* (2006.01)
*E21B 33/12* (2006.01)

(56) References Cited

U.S. PATENT DOCUMENTS

| | | | |
|---|---|---|---|
| 5,066,198 A | 11/1991 | Decker | |
| 5,176,164 A * | 1/1993 | Boyle | E21B 34/06 |
| | | | 137/155 |
| 5,211,242 A | 5/1993 | Coleman et al. | |
| 6,068,015 A * | 5/2000 | Pringle | E21B 43/123 |
| | | | 137/155 |
| 6,629,566 B2 | 10/2003 | Liknes | |
| 7,347,273 B2 | 3/2008 | George et al. | |
| 7,373,972 B2 | 5/2008 | Ocalan | |
| 8,387,710 B2 | 3/2013 | George et al. | |
| 9,062,521 B2 | 6/2015 | Steele | |
| 2008/0149187 A1 | 6/2008 | Ocalan | |
| 2011/0083859 A1 | 4/2011 | Scranton et al. | |
| 2013/0140040 A1 * | 6/2013 | George | E21B 34/08 |
| | | | 166/386 |

* cited by examiner

FIG. 3
CONCENTRIC POWER PISTON

FIG. 4
CONCENTRIC PILOT PISTON

CROSSOVER VALVE SYSTEM AND METHOD FOR GAS PRODUCTION

FIELD OF THE INVENTION

The present invention is directed to a valve and a method to enhance production from gas wells, and particularly gas wells with low flow pressures and inconsistent production line pressure.

BACKGROUND

Gas wells, and in particular sour gas wells with varying quantities of $H_2S$ are produced throughout the Western Canada Sedimentary Basin. Even when reservoir pressures deplete, the remaining gas volumes left in the reservoir are usually significant. The challenge is to produce the remaining reserves with low flowing pressures and inconsistent production line pressures.

Sour gas wells are typically completed with a packer in place to isolate the sour production from the annular space between the well casing inside diameter and the outside diameter of the production tubing. The packer prevents sour gas from entering the annulus and corroding the casing string, which is the barrier between the wellbore and any adjacent ground water or aquifer. Additionally, the annulus above the packer is typically filled with inhibited brine solution to enhance corrosion protection and provide an additional barrier preventing migration of sour gas into the annulus.

All gas wells will produce a quantity of liquid during gas production. Liquid loading is a symptom of the well's inability to unload liquids that are naturally produced during the production life of the well and is the most common cause of production decline in a gas well. In addition to liquid loading, there are a number of other reasons why wells will not produce at the maximum level. If a number of wells are drilled into the same reservoir and the gas is depleted at a faster than normal rate, the competitive drainage of the reservoir will reduce production. In a compartmentalized reservoir, where reservoir size is limited because of lack of connectivity between the permeable parts of the formation, there may be production issues. Also, production may be limited because of formation damage caused to the near well bore while drilling the well or on subsequent work over with a service rig or natural near well bore damage may also be caused by liquid loading or natural scaling effects of the produced well effluent.

When a well is initially drilled, it is typically in a virgin part of the reservoir, and therefore reservoir pressures and volumes are usually quite high. The surface production lines that will transport the gas and liquids are operated at pressures that allow the well to flow to surface. The difference between the surface lines pressure and the flowing bottom hole pressure of the well will dictate how much the well can flow. Other factors also relate directly to this such as gas density, friction effect, liquid density and depth of the well. As the well ages and flowing bottom hole pressure depletes, the well will experience reduced flow capability.

It is well known that liquid loading affects gas production when gas velocity drops below the level necessary to carry liquid droplets upwards, known as the critical gas velocity. Critical gas velocity is a function of flowing pressure, fluid and gas density, droplet size, surface tension, temperature and pipe diameter.

One method of increasing gas velocity is to change tubular size or decrease surface pressure, and the effect on the wells ability to unload liquid can be dramatic when such solutions are applied. However, these solutions will only last as long as the bottom reservoir pressure can produce against the new conditions.

Unfortunately for most sour gas wells, the option to change tubulars or decrease surface pressures is often uneconomic, and the well is abandoned long before its usable reserves are depleted. The cost to change out tubulars is high (rig, safety equipment, pump trucks etc.) and there is a significant risk of potential damage to the formation, which may occur as the well has to be killed using a fluid having hydrostatic weight equal or greater than the shut in reservoir pressure. In many cases the depth of the well and the low reservoir pressure will not hold a full column of kill fluid and the fluid will fracture into the formation face, causing damage that cannot be repaired.

Surface pressure may be reduced by using a compressor to reduce the flowing wellhead pressure in the wellbore. The cost is directly related to the size of compressor required to have sufficient suction pressure that allows the well to unload liquid with the elevated velocity required to produce the gas to the gathering system lines. Most compressors for sour gas are required to have numerous safety shutdown systems and expensive coolers to reduce the heat of compressed gas and noise emission controls.

Artificial lift in these wells is difficult to implement. Most types of downhole mechanical or electrical pumps do not work well in a high gas environment due to gas locking and cavitation. The costs of the modifications or additional completion components required to adapt the pumping systems to efficient operation in high gas ratio environments can also be prohibitively expensive.

Therefore, there is a need in the art for an innovative and economical solution to produce gas from these aging reservoirs.

SUMMARY OF THE INVENTION

In one aspect, the invention comprises a down hole crossover valve as part of an operational system that uses reservoir energy and injected gas to produce gas. In one embodiment, the produced gas and injected gas may activate a plunger which reciprocates up and down the well bore, which acts as interface between the produced liquid and produced gas, thereby unloading all liquid to surface. The plunger may be cycled numerous times throughout the day and the frequency of cycling is only dependent on how much gas is available for each cycle.

Therefore, in one aspect, the invention comprises a method of producing a vertical, deviated or horizontal gas well having an annular space defined by a well casing and a concentrically disposed production tubing, said well having a lower producing zone open to the production tubing, wherein the annulus is isolated from the lower producing zone by a packer, comprising the steps of:

(a) opening a communication path through the tubing into the annulus, and if necessary, removing any liquid in the annulus;

(b) landing at least one crossover valve within the production tubing exposed to the annulus, wherein the crossover valve has a pilot section having a predetermined closing pressure, a power section and a crossover fluid passage; and (c) injecting gas into the annulus to at least the closing pressure to activate the pilot section, thereby exposing the power section to the annulus, thereby opening the crossover fluid passage and allowing injected gas to enter the production tubing, wherein the injected gas lifts liquids in the production tubing to the surface.

In one embodiment, the at least one crossover valve is deployed on a continuous or jointed tubing string or by wireline, within the production tubing.

In another aspect, the invention may comprise a crossover valve assembly for insertion into production tubing, or integral with production tubing, comprising:
 (a) an outer housing;
 (b) an inner production tube;
 (c) a pilot section responsive to external pressure above a pre-determined pressure to open an activation passage;
 (d) a power section responsive to pressure in the activation passage to open an injection opening; and
 (e) a crossover valve responsive to the external pressure to open a crossover port, allowing fluid communication from outside the outer housing to within the inner production tube.

In one embodiment, the invention comprises a crossover valve assembly comprising:
 (a) a pilot section comprising an outer housing and an inner production tube disposed concentrically within the housing, defining an annular space therebetween, a pilot valve assembly within the annular space and comprising a valve seat and a pilot piston moveable between a closed position and an open position, a pilot chamber exposed through a pilot opening in the outer housing, and a spring for biasing the pilot piston towards the closed position;
 (b) a power section comprising an outer housing and an inner production tube disposed concentrically within the housing, defining an annular space therebetween, a power valve assembly disposed within the annular space and comprising a valve seat, a valve mandrel and an activation piston, wherein the valve mandrel and the activation piston are moveable between a closed position and an open position, wherein the power section defines an activation chamber;
 (c) an activation fluid passage between the pilot chamber and the activation chamber, which is closed when the pilot piston is in its closed position, and open when the pilot piston is in its open position, and wherein fluid pressure in the activation fluid passage moves the activation piston and valve mandrel to their open position;
 (d) a crossover fluid passage through the power section outer housing and the power section inner production tube which is closed when the activation piston and the valve mandrel are in their closed position.

In one embodiment, the pilot piston is biased in the closed position by a pre-determined closing pressure created by means of a mechanical spring such as a coil spring, or a gas spring, or both a mechanical and gas spring, acting within the pilot section. The power section may comprise an equalization pathway between the activation chamber and open to outside the outer housing, which equalization pathway is more restrictive to gas flow than the activation passage. In one embodiment, the gas spring is connected to a gas supply line which can be activated to increase or reduce the pressure of the gas spring, thereby increasing or reducing the closing pressure.

In one embodiment, the crossover valve assembly comprises an electrical control module operatively connected to a remote controller, comprising a solenoid and pilot pressure regulator, which opens to expose the pilot section to external pressure, and closes to isolate the pilot section from external pressure.

In embodiment, the crossover valve assembly further comprises an electrical control module operatively connected to a remote controller, comprising a pilot gas supply line and a pilot gas regulator, for remotely charging or discharging the gas spring.

In another aspect, the invention may comprise a system for producing a vertical, deviated or horizontal gas well having an annular space defined by a well casing and a concentrically disposed production tubing, said well having an annulus and a lower producing zone open to the production tubing, wherein the annulus is isolated from the lower producing zone by a packer, comprising:
 (a) a communication path through the production tubing into the annulus;
 (b) at least one crossover valve within the production tubing exposed to the annulus through the communication path;
 (c) a surface gas injector and a gas supply for injecting gas into the annular space to open the crossover valve and enter the production tubing;
 (d) a plunger for reciprocating within the production tubing; and
 (e) a controller for controlling the gas injector, wherein the controller is responsive to a signal indicative of one or more of the following: the position of the plunger, pressure in the annulus, pressure, gas flow in the production tubing, tubing fluid level, or pressure differential between the tubing and the annulus In one embodiment, the at least one crossover valve is deployed on a continuous or jointed tubing string, within the well casing. In one embodiment, the system may further comprise a plunger for reciprocating within the production tubing. The system may further comprise a controller for controlling the gas injector, wherein the controller is responsive to a signal indicative of one or more of the following: the position of the plunger, pressure in the annulus, pressure or gas flow in the production tubing, tubing fluid level, or pressure differential between the tubing and the annulus.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

When describing the present invention, all terms not defined herein have their common art-recognized meanings. To the extent that the following description is of a specific embodiment or a particular use of the invention, it is intended to be illustrative only, and not limiting of the claimed invention.

This invention relates to a controllable crossover valve and systems which incorporate the valve to enhance gas production by means of gas lift or gas re-circulation workflows. During gas lift/gas re-circulation workflows, the working fluid comprises injected gas which moves from outside the production tubing to within the production tubing.

In one embodiment, the apparatus of the present invention is designed to facilitate production of gas wells with low flow pressures and/or inconsistent production line pressure, and sour gas wells in particular. However, the term "fluid" is used herein as comprising both liquids and gases.

Figure 1:
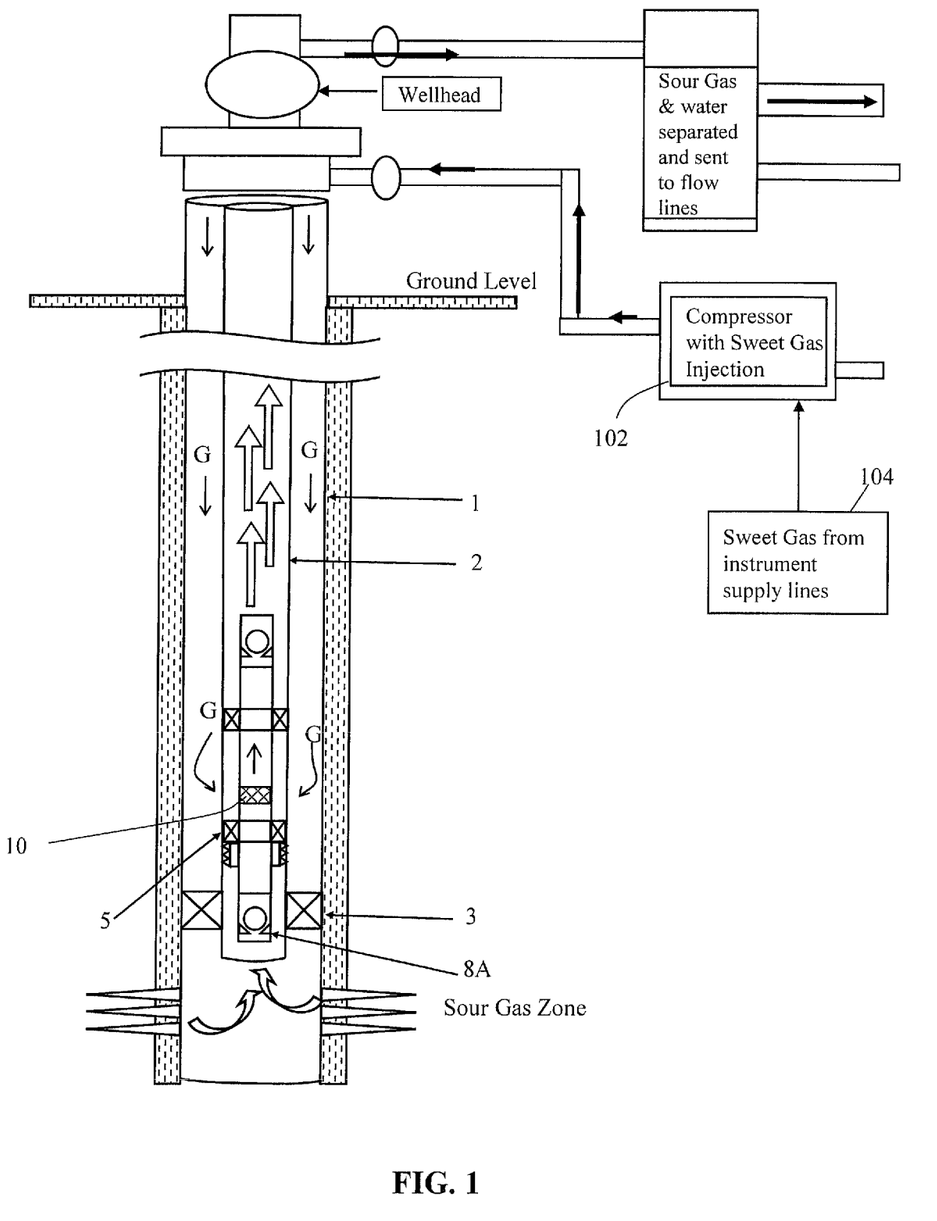
FIG. 1 is a schematic representation of a wellbore with an annulus and lower producing zone, sectioned vertically along its length and depicting the crossover valve through-tubing completion.

As shown in FIG. 1, a producing gas well comprises a casing string (1) and a concentric production tubing string (2), defining an annular space between them. A packer (3) within the annulus provides a seal between the tubing outside diameter and the casing inside diameter, and isolates the upper annulus from the producing zone. The packer prevents cross-flow of produced liquids and gas above the packer and protects the casing from corrosion usually associated with $H_2S$, as the casing is the only barrier between the wellbore and the surrounding natural formation.

Many sour gas well sites are equipped with high pressure, sweet fuel gas for instrumentation operation. This source gas may also be an excellent medium for annular circulation gas. Therefore, in one aspect, the invention comprises a method of producing natural gas from an isolated zone, such as a sour gas zone, by using injected sweet gas to lift liquids in the production tubing to the surface. In general terms, in another aspect, the apparatus of the present invention comprises a crossover valve device, which opens in response to pressure in the casing annulus, or as result of direct control, to permit fluid flow from the annulus into the tubing string.

Figure 2:
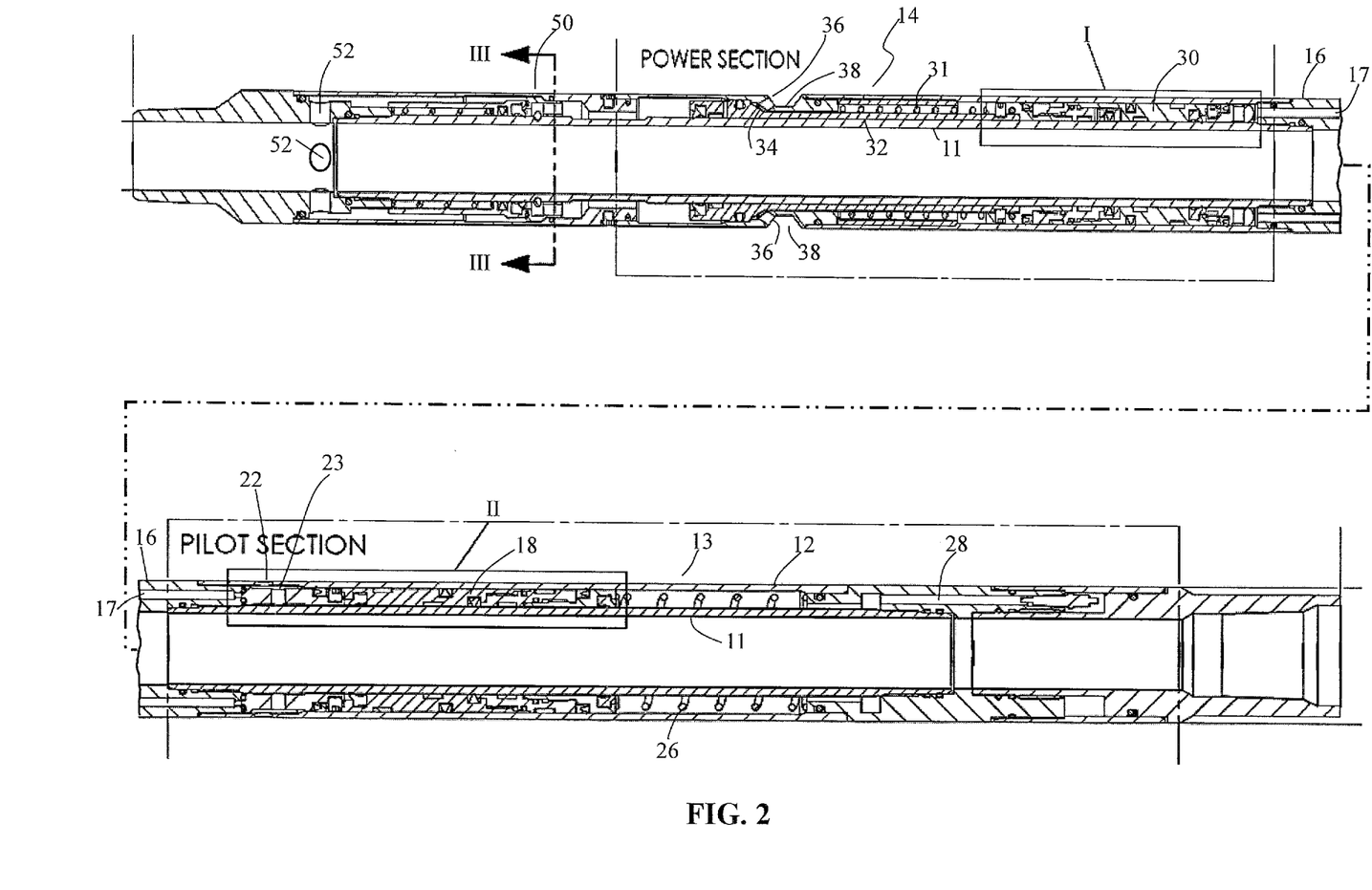
FIG. 2 is a schematic representation of the crossover valve device sectioned along its length to reveal all of the working components.

The crossover valve assembly (10) comprises a number of inner tubular elements (11) assembled together to define an internal production flow path, and an outer housing (12). Various functional components described below are disposed in the annular space between the inner tubulars (11) and the outer housing (12). In one embodiment, the valve assembly comprises a pilot section (13) and a power section (14), connected by an intermediate pup joint (16) defining an annular fluid passage (17). In one embodiment, the valve assembly (10) is adapted to be run on wireline, or deployed on continuous or jointed tubing string. In one embodiment, the valve may be an integral component of a tubing string.

Figure 4:
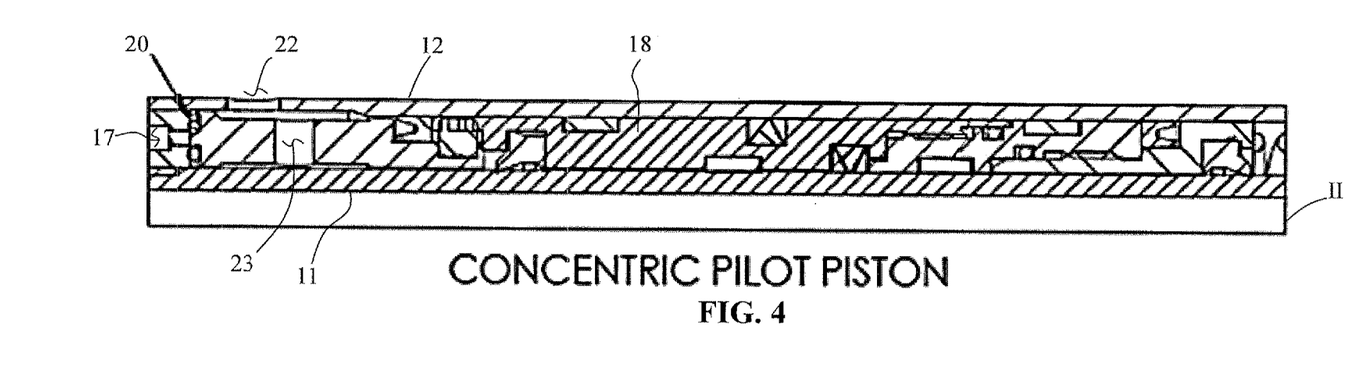
FIG. 4 is a detailed view of area II of FIG. 2, showing the pilot section valve assembly.
Figure 5:
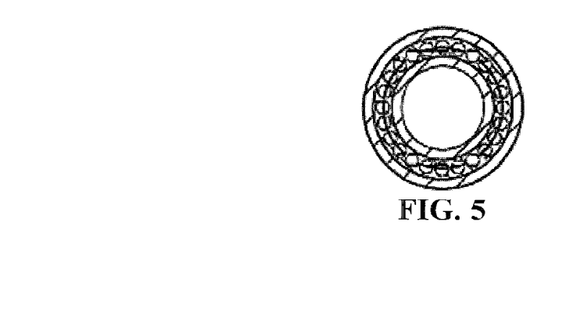
FIG. 5 is a transverse cross-sectional view along line III-III in FIG. 2.

The pilot section comprises a concentric sliding pilot piston (18), a pilot valve seat (20) and an annulus pressure opening (22) in the outer housing (12). In its closed position, as shown in FIGS. 2 and 4, the downhole end of the pilot piston (18) is seated against valve seat (20), closing off the pup joint fluid passage (17) from external pressure. The pilot piston (18) is appropriately sealed with seals which slide against the inner surface of the housing (12) and the outer surface of the inner tubing (11).

The pilot piston (18) is biased towards its closed position by a mechanical spring (26), or a gas spring (28), or a combination of a mechanical spring and a gas spring. As shown in FIG. 2, a pilot pressure chamber (28) is filled with a gas, preferably an inert gas such as nitrogen, through a valve (24), and resists upward movement of the pilot piston (18). The external pressure in the casing annulus required to activate the pilot section (13) must overcome the closing pressure, which is the sum of the gas pressure in chamber (28) and the pressure exerted by the mechanical spring.

To activate the crossover valve assembly, gas (G) is injected into the casing annulus until the annular pressure is greater than the closing pressure. The injected gas bears on the pilot piston (18) through the external pressure opening (22), and the pilot piston (18) is urged upwards as injected gas fills the pilot chamber (23), until the external pressure equals the closing pressure exerted by the mechanical spring and the gas spring.

Figure 3:
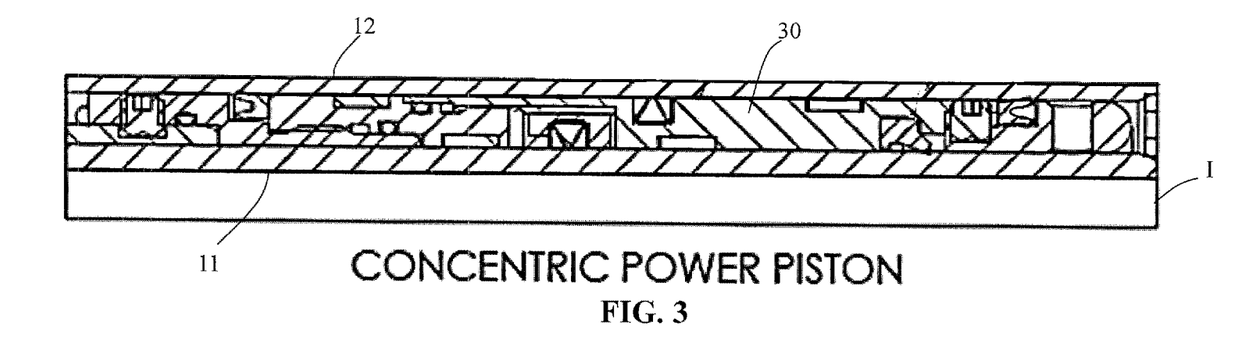
FIG. 3 is a detailed view of area I shown in FIG. 2, showing the power section valve assembly.
Figure 6:
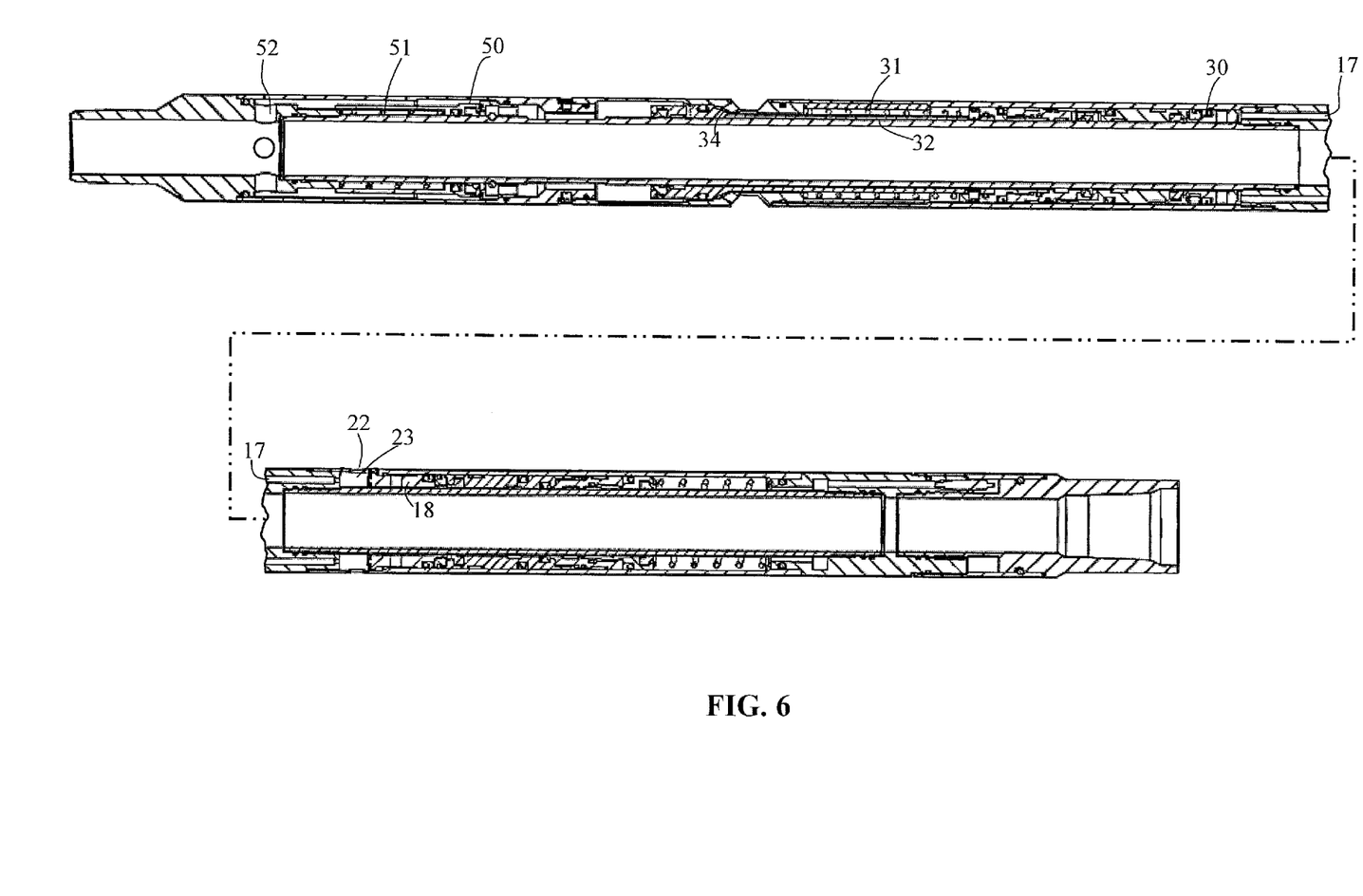
FIG. 6 is a cross sectional view of the crossover valve of FIG. 2, shown with the pilot valve assembly in its open position.
Figure 7:
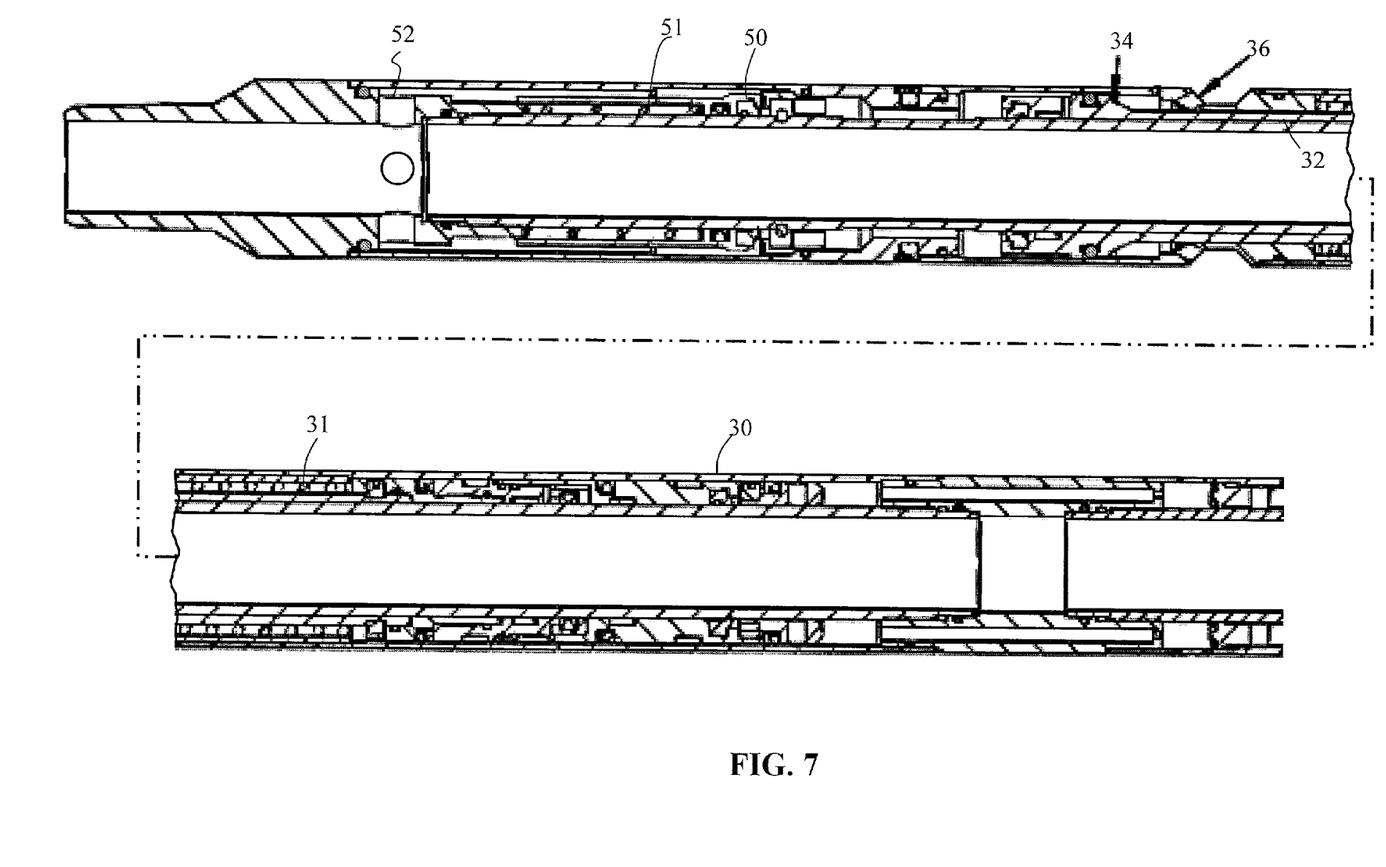
FIG. 7 is a cross sectional of the power section of the crossover valve of FIG. 2, shown with the power valve assembly in its open position.

As the pilot piston (18) unseats, the injected gas in the pilot chamber (23) then travels through the pup joint fluid passage (17) and enters an activation chamber in the power section (14), bearing upon the power piston (30), which is also a sealed concentric sliding piston. In one embodiment, the power piston is biased in a closed position by a mechanical spring (31).

The power piston (30) pushes against a mandrel (32) having a valve face (34) which is seated against an injection gas inlet (36) through the outer housing. The injection gas inlet may be provided in a circumferential groove (38) around the outer housing which has an angled conical section. The valve face (34) has a matching conical section which sealingly engages the injection gas inlet (36) when closed.

Figure 8:
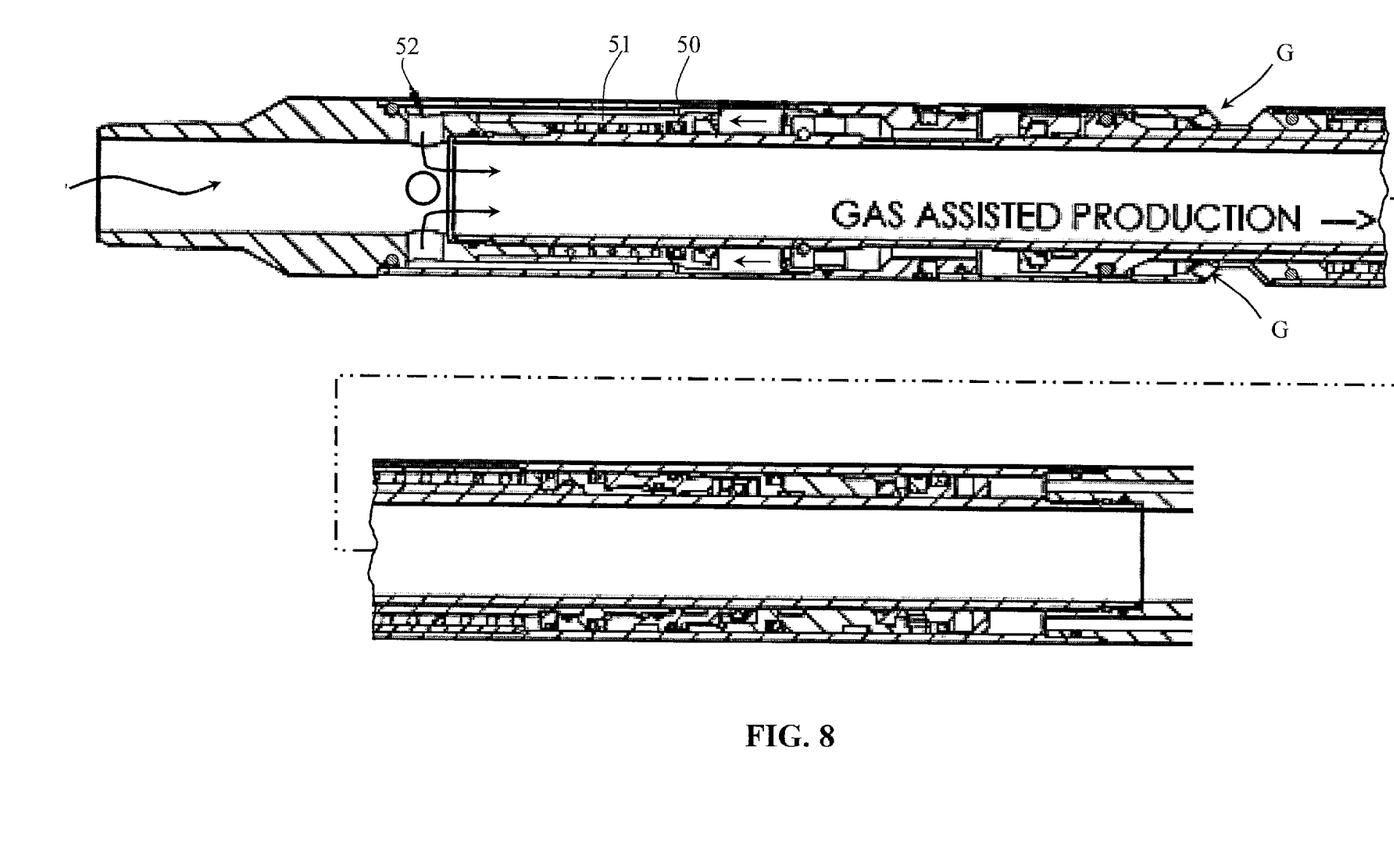
FIG. 8 is a cross sectional of the power section of the crossover valve of FIG. 2, shown with the RCV valve in its open position.

As injected gas (G) in the casing annular space enters the power section (14) through gas inlet (36), it proceeds through the valve assembly between the power section inner tubular (11A) and the outer housing (12) until it reaches the redundant check valve or RC valve (50). The injected gas has sufficient pressure to unseat the, and pass through crossover port (52) and enters the internal production flow path of the valve (10). The RC valve (50) is biased closed by a mechanical spring (51), the force of which may be overcome by the injected gas pressure. The RC valve (50) is shown seated (closed) in FIG. 6 and unseated (open) in FIG. 8.

When the external annular pressure outside the valve assembly drops below the closing pressure of the pilot section, the pilot piston (18) will be urged towards its closed position until it seats against the valve seat (20), which initiates the crossover valve closure sequence. If the annular pressure continues to drop, the fluid in the pup joint fluid passage (17) and the activation chamber is allowed to slowly equalize to the lower external annular pressure through a restrictive bypass (42) which exists between the power section inner tubular (11A) and the outer housing (12) around the power piston (30). Once the pressure in the activation chamber is lower that the biasing force exerted by the power section mechanical spring (31), the power piston (30) returns to its closed position. When the power piston returns to its closed position, the valve face (34) seats on and closes the injection gas inlet (36). The RCV valve (50) will then close and the crossover valve assembly (10) again isolates the annulus from the production tubing.

The restrictive bypass (42) is always open, but provides sufficient resistance to gas flow to allow gas pressure from the pilot section to open the power piston through the activation passage, while allowing equalization within a reasonably short period of time, in one embodiment, in the order of a few minutes.

Therefore, the valve assembly (10) will open an injection opening at annular pressures above the pilot section closing pressure, and will begin a closing sequence when the annular pressure drops below the closing pressure. In one embodiment, the closing pressure of the pilot section of the valve is adjusted by adjusting the strength of the mechanical spring and the gas spring, if both are used. The selected closing pressure may be determined by considering the well depth, annulus volume available and gas/liquid ratios. In one embodiment, the closing pressure of the pilot section will be set significantly higher than the minimum tubing pressure], thereby ensuring no sour gas in the production tubing can escape into the annulus through the valve assembly (10). For example, the closing pressure may be set at 500 kPa over the minimum tubing pressure. This will ensure the valve assembly is always closed, except when there is significant higher pressure in the annulus, which is particularly important in the absence of the inhibited annulus fluid to prevent sour gas migration into the annulus. In addition, the valve may be equipped with isolation mechanisms (or barriers) between the production tubing inside diameter where sour gas resides and the annulus which is required to remain sweet.

In one embodiment, the gas spring can be charged to a very high pressure during assembly of the valve assembly (10), before use in the field, and can then be adjusted to a desired pressure for the particular downhole conditions it will encounter before installation down hole. The mechanical spring provides a fixed closing pressure, while the gas spring may provide a variable customizable closing pressure.

In one embodiment, the gas spring may be connected with gas capillary lines, a regulator, and a controller. The gas spring may thus be charged with gas to increase the pilot closing pressure, or gas may be discharged to decrease the pilot closing pressure, after installation, as desired.

Therefore, in one embodiment, the crossover valve comprises three actuating components, the pilot section, the power section and the RC valve, which interact by gas pressure and not physical linkage. External pressure causes the pilot section to expose an activation chamber to the external pressure, thereby activating the power section, which opens an injection opening which then opens the RC valve.

In one embodiment of operation, and with reference to FIG. 1, a bottom hole check valve (8A) is placed into the bottom of production tubing string, which functions to prevent gas injected from surface entry into the formation when the well is completed, but does allow gas flow from the formation into the tubing string.

The crossover valve (10) assembly can be run using wire line techniques or coiled or jointed tubing techniques that are well known in the industry and need not be further described here. If an existing sliding sleeve is part of the production string, it may be opened. Alternatively, the tubing (2) may be perforated above the isolation packer (3). The valve (10) is landed at the isolation packer (3), level with an open sliding sleeve or with tubing perforations. The valve is located in between two thru-tubing pack-offs (4, 5) which isolate the production tubing (2) above and below the valve (10). Any gas from the annulus can only enter the production tubing through the valve (10). Suitable anchor and packer configurations are described, for example, in co-owned U.S. Pat. No. 7,347,273 B2, the entire contents of which are incorporated herein by reference (where permitted).

Any inhibited fluid in the annulus may be removed using conventional means, such as by circulation of nitrogen gas.

Once the downhole equipment has been installed and any inhibited fluid has been removed, a sweet gas compressor (102) can compress low volume gas from the instrument supply line (104) and inject it down the casing tubing annulus. Once the annular pressure exceeds the closing pressure of the crossover valve (10), the injected sweet gas (G) will pass through the valve (10) into the production tubing, overcome the flowing bottom hole pressure, and cause the bottom check valve (8A) to close. Thus, all the sweet annular gas (G) will move upwards in the production tubing. This will increase the gas velocity, preferably to above the critical rate, and drive any liquid column in the production tubing to the surface.

Once the liquid column is produced, the pressure in the annulus may be reduced, closing the valve (10), while still maintaining a positive pressure differential against the production tubing. With the liquid hydrostatic column removed from the well bore, the well can now produce to full potential through the bottom check valve (8A). The production cycle is repeated when the injected gas pressure in the annulus has reached the required pressure to open the crossover valve (10) again.

A plunger assembly (not shown) may be introduced into the tubing string to allow the well to be operated at lower gas velocities, as is well known in the art. The plunger acts as an interface between the liquid column and the injected gas. Because the plunger is a dynamic seal with close tolerance between the plunger body and the tubing wall (as opposed to perfect seal), it still requires velocity to move the liquid up hole, however the cross sectional area of the plunger coupled with the gas velocity trying to pass the outside creates a differential pressure from below which drives the plunger and the liquid column to surface.

Figure 9:
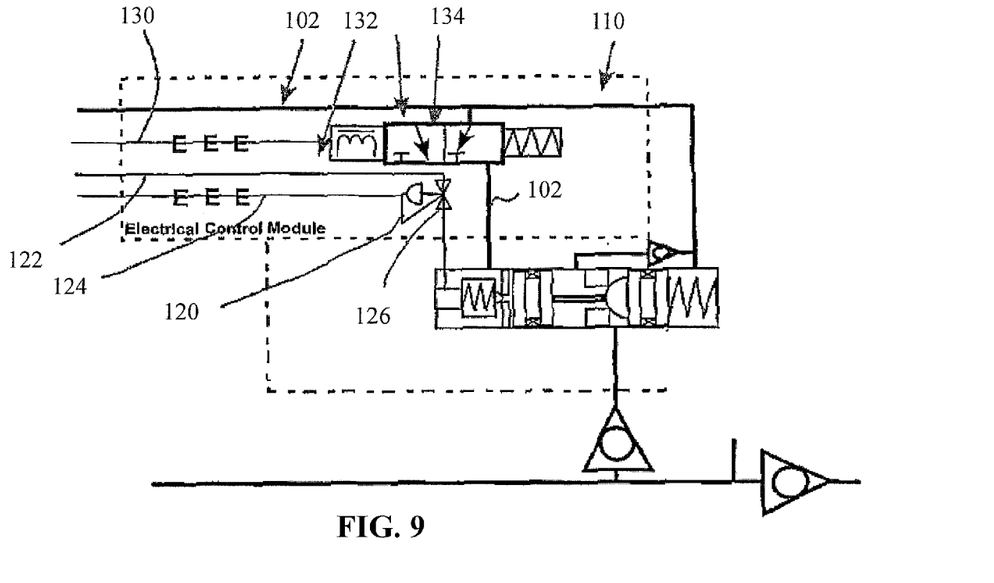
FIG. 9 is a schematic representation of one embodiment of a crossover valve assembly having an electrical control module.

In an alternative embodiment, a crossover valve assembly (100) includes the components described above, and further comprises an electrical control module (110) or ECM, The ECM (110) is operative to modify operation of the crossover valve (100), either by controlling delivery of pilot gas to charge or discharge the pilot gas spring, or by otherwise modulating or overriding operation of the pilot section, or both.

As shown schematically in FIG. 9, a pilot gas regulator (120) is connected by a capillary line (122) to a supply of pilot gas, which may be at the surface. A pilot controller (not shown) connects to the regulator (120) by a control line (124), and actuates the regulator (120) to open or close a valve (126) to charge or discharge the gas spring as required.

Another control line (130) connects a controller (not shown) to a solenoid (132), which actuates a pilot control valve (134). When open, the pilot control valve (134) exposes the pilot section of the crossover valve assembly (100) to injection gas pressure (102) in the casing annulus. If closed, the pilot section remains isolated from the casing annulus pressure, and therefore, the pilot section cannot actuate the power section to open the crossover valve. Thus, the controller can deactivate a crossover valve assembly (100) while still injecting as into the casing annulus above the closing pressure of the pilot section.

Figure 10:
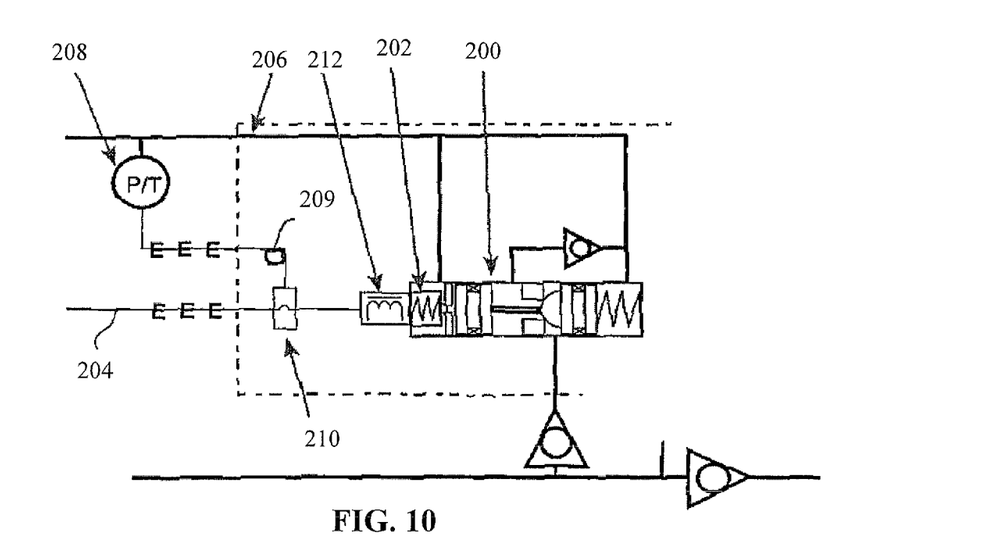
FIG. 10 is a schematic representation of one embodiment of a crossover valve with direct solenoid actuation of the pilot section.

In an alternative embodiment, as shown schematically in FIG. 10, the pilot section (202) of the crossover valve assembly (200) is directly regulated by a control signal received over a control line (204) which connects to a controller (not shown). A pressure transducer (208) senses injection gas pressure (206) in the casing annulus and may connect to the control line (204) via a controller (209) and a relay (210). Accordingly, at a pre-determined pressure in the casing annulus, as sensed by the pressure transducer, the controller will actuate the solenoid (212) to release the pilot section. The injected gas will then activate the pilot section as described above. In this case, the pilot section closing pressure is determined by the combined action of the pressure transducer, controller and solenoid, and not by any physical biasing means contained in the pilot section. A control signal may then close the pilot section after a desired length of time, or at a pre-determined pressure as determined by the pressure transducer.

In one embodiment, the system may comprise electronic monitoring and pressure recording to determine when the system operates, such as, for example, by using a PLC (Programmable Logic Controller) with various analog and digital inputs and outputs, which can read and record signals from external sensors such as pressure transducers or flow meters. These transducers constantly sample the well pressures and will signal the PLC control box to open casing valves to flow or shut in. The PLC may also have a proximity switch which detects the plunger arrival at surface and records times and flow rates. With these electronic instruments and control, the well can be left with no human intervention once the flow cycles are set into the controller. These set pressures and times can be adjusted to suit the changing well conditions.

Alternate means exist of completing this production workflow including, but not limited to a locking and sealing mandrel assembly (as is well known in the art) to engage and seal in an existing selective profile nipple integral to the production tubing string. This would replace the tubing packer (5) depicted in FIG. 1. This completion is possible if a selective profile nipple exists and is easily accessible in the wellbore relative to the location of the communication ports through the production tubing wall. In another alternative, the tool string may be landed across an open sliding sleeve providing communication through the wall of the tubing from the annulus. All of the elements of the tool string may be designed to pass through the largest standard selective profile nipple size in order to easily facilitate landing said tool string across an existing sliding sleeve (equipped with profile nipple) or below an existing profile nipple in the event that complex wellbore geometry is encountered.

What is claimed is:

1. A crossover valve assembly for insertion into production tubing, or integral with production tubing, comprising:
   (a) an outer housing;
   (b) an inner production tube;
   (c) a pilot section responsive to external pressure above a pre-determined pressure, or responsive to an electrical actuator, to open an activation passage;
   (d) a power section responsive to pressure in the activation passage to open an injection opening through the outer housing; and
   (e) a crossover valve responsive to the external pressure via the injection opening to open a crossover port, allowing fluid communication from outside the outer housing to within the inner production tube.

2. The crossover valve assembly of claim 1 wherein the pre-determined pressure is set by means of a mechanical spring, or a gas spring, or both a mechanical spring and a gas spring, acting within the pilot section.

3. The crossover valve assembly of claim 1, wherein the pre-determined pressure is set at least partially by a gas spring, and wherein the gas spring is connected to a pilot gas supply by a pilot gas regulator, which is configured to charge or discharge the gas spring to vary the pre-determined pressure.

4. The crossover valve assembly of claim 1 wherein the power section comprises an equalization pathway open to outside the outer housing, which equalization pathway provides sufficient resistance to gas flow to allow gas pressure from the pilot section to open the activation passage, while allowing pressure in the power section to equalize to a lower external pressure within a period of time.

5. The crossover valve assembly of claim 1, wherein:
   (a) the pilot section comprises a pilot section inner production tube disposed concentrically within the outer housing, defining an annular space therebetween, a pilot valve assembly within the annular space and comprising a valve seat and a pilot piston moveable between a closed position and an open position, a pilot chamber exposed through a pilot opening in the outer housing, and a spring for biasing the pilot piston towards the closed position;
   (b) the power section comprises a power section inner production tube disposed concentrically within the outer housing, defining an annular space therebetween, a power valve assembly disposed within the annular space and comprising a valve seat, a valve mandrel and an activation piston, wherein the valve mandrel and the activation piston are moveable between a closed position and an open position, wherein the power section defines an activation chamber;
   (c) the activation passage is between the pilot chamber and the activation chamber, which is closed when the pilot piston is in its closed position and open when the pilot piston is in its open position, and wherein fluid pressure in the activation passage moves the activation piston and the valve mandrel to their open position;
   (d) the crossover port is through the outer housing and the power section inner production tube, which is closed when the activation piston and the valve mandrel are in their closed position and open when the activation piston and the valve mandrel are in their open position; and
   (e) an equalization fluid passage between the power section inner production tube and the outer housing around the activation piston, which equalization passage provides sufficient resistance to gas flow to allow gas pressure from the pilot section to open the activation fluid passage, while allowing pressure in the power section to equalize to a lower external pressure within a period of time.

6. The crossover valve assembly of claim 5 wherein the spring for biasing the pilot piston comprises a mechanical spring or a gas spring, or both a mechanical spring and a gas spring.

7. The crossover valve assembly of claim 3 further comprising an electrical control module operatively connected to a remote controller, comprising a pilot control valve, wherein the pilot control valve opens to expose the pilot section to external pressure, and closes to isolate the pilot section from external pressure.

8. The crossover valve assembly of claim 6 further comprising an electrical control module operatively connected to a remote controller, comprising a pilot gas supply line and a pilot gas regulator, for remotely charging or discharging the gas spring.

9. The crossover valve assembly of claim 1, wherein: the pilot section is responsive to the electrical actuator to open the activation passage, which is then open to the external pressure.

10. The crossover valve assembly of claim 9 wherein the electrical actuator is responsive to a signal from a remote controller or a signal from a pressure transducer, or both.

* * * * *